US005539294A

United States Patent [19]

Kobayashi

[11] Patent Number: 5,539,294

[45] Date of Patent: Jul. 23, 1996

[54] POSITION DETECTOR FOR REMOTE CONTROL SYSTEM

[75] Inventor: Kiyonobu Kobayashi, Hamamatsu, Japan

[73] Assignee: Sanshin Kogyo Kabushiki Kaisha, Shizuoka-ken, Japan

[21] Appl. No.: 41,872

[22] Filed: Apr. 2, 1993

Related U.S. Application Data

[63] Continuation of Ser. No. 765,135, Sep. 25, 1991, abandoned.

[30] Foreign Application Priority Data

Sep. 27, 1990 [JP] Japan .................................... 2-255055

[51] Int. Cl.[6] .......................... B63H 21/21; B60K 41/00; B25J 3/04

[52] U.S. Cl. .......................... 318/675; 318/547; 318/553; 440/84

[58] Field of Search .................................... 318/543–553, 318/575, 590, 591, 625, 626, 671, 675; 114/144 R, 144 RE, 144 A, 144 C, 144 E; 440/2, 84, 86, 87; 364/190, 132; 340/709

[56] References Cited

U.S. PATENT DOCUMENTS

| | | | |
|---|---|---|---|
| 890,458 | 6/1908 | Schley . | |
| 2,406,220 | 8/1946 | Hines . | |
| 3,322,994 | 5/1967 | Dever et al. . | |
| 3,545,398 | 12/1970 | Fisher . | |
| 3,641,263 | 2/1972 | Rhoads . | |
| 3,644,816 | 2/1972 | Gilbert | 318/663 |
| 4,156,130 | 5/1979 | Ivashin et al. . | |
| 4,223,624 | 9/1980 | Iyeta | 114/144 E |
| 4,306,314 | 12/1981 | Griffiths | 455/603 |
| 4,484,121 | 11/1984 | Chambron | 318/640 |
| 4,520,355 | 5/1985 | Mitch . | |
| 4,691,659 | 9/1987 | Ito et al. | 114/144 R |
| 4,753,618 | 6/1988 | Entringer | 440/86 |
| 4,759,731 | 7/1988 | Uchida et al. | 440/1 |
| 4,810,216 | 3/1989 | Kawamura | 440/2 |
| 4,831,531 | 5/1989 | Adams et al. | 364/424.01 |
| 4,836,809 | 6/1989 | Pelligrino | 440/2 |
| 4,914,368 | 4/1990 | Orton | 318/663 |
| 5,029,547 | 7/1991 | Novey | 114/159 |
| 5,072,361 | 12/1991 | Davis et al. | 364/167.01 |

*Primary Examiner*—Bentsu Ro
*Attorney, Agent, or Firm*—Knobbe, Martens, Olson & Bear

[57] ABSTRACT

A remote control system for controlling the actuation of control levers through an actuator unit from a remote location by a moveable operator. The system includes a control position detector for detecting the position of the operator which is directly connected to the operator to reduce the manual effort required for actuation of the control levers and to improve the responsiveness of the system.

6 Claims, 4 Drawing Sheets

POSITION DETECTOR FOR REMOTE CONTROL SYSTEM

This is a continuation of U.S. patent application Ser. No. 07/765,135, filed Sep. 25, 1991, now abandoned.

BACKGROUND OF THE INVENTION

This invention relates to a remote control system adapted for a marine propulsion unit, and more particularly to an improved remote control system which includes a remote operator for actuating a controlled element through an electric actuator unit and a detecting arrangement including a detector directly connected to the operator for detecting the position of the operator.

One type of remote control arrangement has been proposed which is employed on certain watercraft to electrically actuate a throttle and/or transmission control lever on an associated marine propulsion unit. With this type of arrangement, movement of a remote operator effects movement of the control lever through an electric actuator mechanically connected to the control lever. A detection-control system is provided which controls the actuator so that the detected position of the remote operator and control lever normally correspond. Such a system typically includes a position detector for each operator and a position detector for each control lever. This type of arrangement has certain advantages. For example, this arrangement does not require the use of cables extending the entire length between the remote operator and the control lever and therefore has the advantage of reducing the operational load normally associated with purely mechanically operated remote control systems.

However, thus far the position detector associated with the operator has been connected with the operator through mechanical cables or the like. Thus, more effort is sometimes required to move the operator to effect actuation of the control lever due to friction and operational lag which is caused by too much "play" in the cables.

It is, therefore, a principal object of this invention to provide a remote control system for a marine propulsion unit which reduces the manual effort required for shifting the transmission and/or adjusting the throttle opening of the marine propulsion unit.

It is another object of this invention to provide an improved remote control system wherein a controlled element of the system is more responsive to movement of the operator.

SUMMARY OF THE INVENTION

This invention is adapted to be embodied in a remote control system for transmitting control movement to a controlled element and which includes a remote control unit having an operator movable between a plurality of positions. The system further includes a first position detector directly connected to the operator for detecting the position of the operator and outputting a signal to a control unit indicative of the detected position of the operator. A second position detector detects the position of the controlled element and outputs a signal to the control unit indicative of the detected position of the controlled element. An actuator unit including a motor is provided for actuating the controlled element on the basis of the signals received by the control unit.

DETAILED DESCRIPTION OF THE PREFERRED EMBODIMENT OF THE INVENTION

Figure 1:
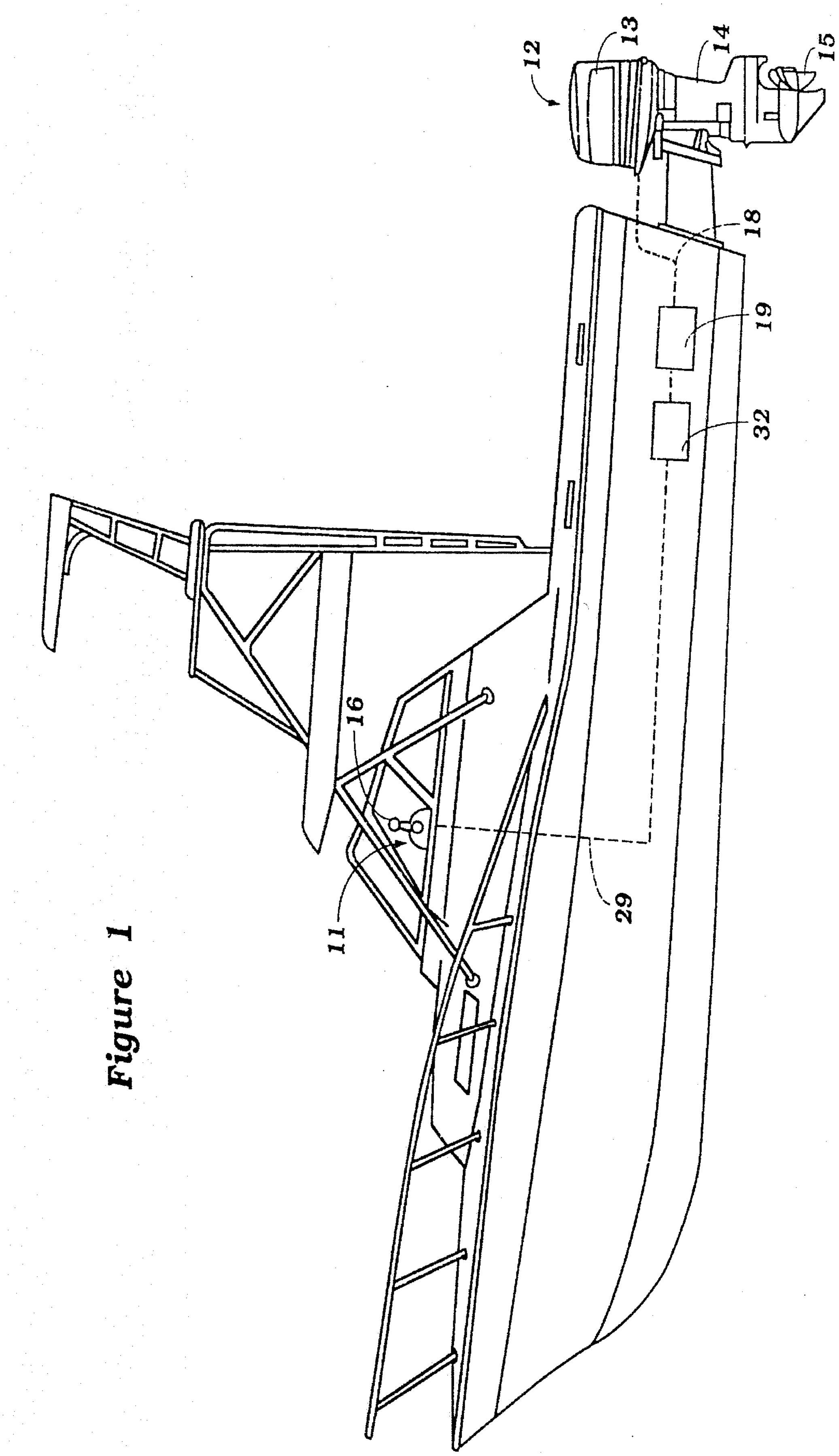
FIG. 1 is a side elevational view of a watercraft with a remote control system illustrated schematically and constructed and operated in accordance with an embodiment of the invention.

Referring first to FIG. 1, a remote control system for operating a marine propulsion unit from a remote location is illustrated. A remote control unit, indicated generally by the reference numeral 11, is located in the cabin of an associated watercraft. Another remote control unit (not shown) may be positioned on the bridge of the watercraft. The remote control unit 11 and any additional units are provided for controlling the throttle and/or transmission of a marine propulsion unit, identified generally by the reference numeral 12. The marine propulsion unit 12 may comprise either an outboard motor or the outboard drive portion of an inboard/outboard drive unit.

In the illustrated embodiment, the marine propulsion unit 12 includes a power head 13 that contains an internal combustion engine (not shown) and which is surrounded by a protective cowling. The internal combustion engine drives an output shaft which, in turn, drives a drive shaft that is journaled for rotation within a drive shaft housing 14 that depends from the power head 13. This drive shaft (not shown) drives a propeller 15 of a lower unit by means of a conventional forward, neutral, reverse transmission of the type used with such propulsion units.

A transmission control lever is positioned on the marine propulsion unit 12 that is designed to operate this transmission. In addition, there is provided a throttle control lever that is adapted to control the speed of the powering internal combustion engine by controlling the throttle opening of the engine. These control levers are actuated by the remote control unit 11 in a manner to be described.

Figure 2:
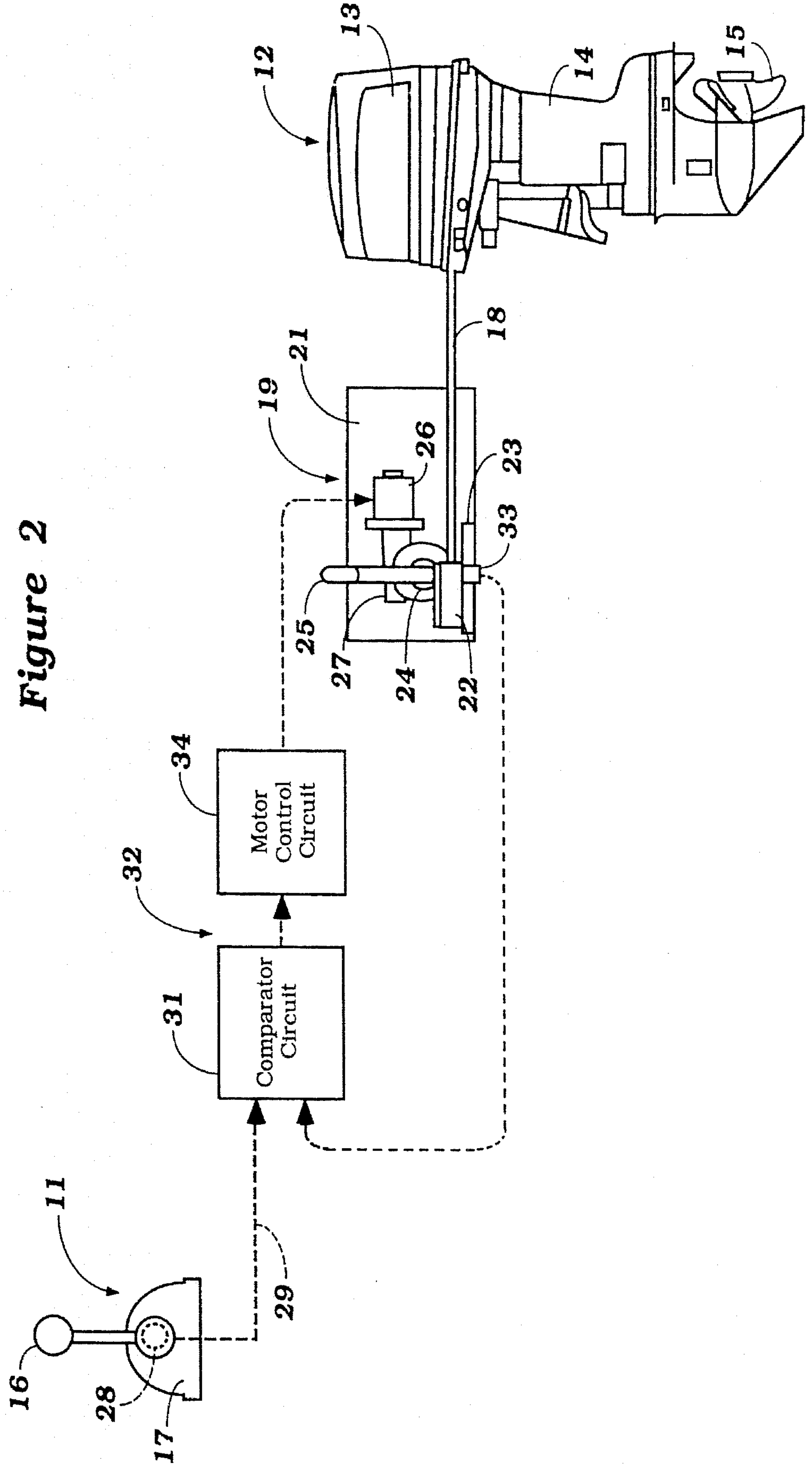
FIG. 2 is a partially perspective and partially schematic view of the remote control system in connection with a marine propulsion unit and showing the position detector for the operator embodied within the remote control unit.

Referring now to FIG. 2, in addition to FIG. 1, the remote control unit 11 is comprised of an operator 16 which may be pivotally moved relative to a housing 17. Preferably, the remote control unit 11 is selectively adapted to control both the transmission and throttle of the propulsion unit 12 and to control only the throttle while the transmission is held in neutral. When set to control both, the unit 11 and system operates so that when the operator 16 is moved within a range between 30° rearward and 30° forward from the upright position shown in FIG. 2, the transmission is maintained in neutral and the throttle opening is kept relatively small. When the operator 16 is swung forward beyond 30° but within 60° from upright, the transmission is shifted to the forward position and the throttle opening is progressively increased. When the operator 16 is pivoted rearward beyond 30° but within 60° from upright, the transmission is shifted to the reverse position and the throttle opening is increased accordingly. When the unit 11 is set for free throttle adjustment, movement of the operator 16 forward from the upright position causes a corresponding increase in throttle opening.

A cable 18 extends between the throttle or transmission control lever and an electromotive actuator unit 19 for actuation of the lever. This actuator unit 19 comprises an electric actuator as well as a manual actuator for controlling movement of the lever and thus for controlling the throttle or transmission of the marine propulsion unit 12. The actuator unit 19 and its associated components are contained within a casing 21. A similarly constructed and arranged actuator unit and associated components (not shown) are provided for actuation of the other control lever on the propulsion unit 12. The details of actuator unit 19 as well as its operation will now be described in connection with the throttle control lever.

The cable 18 has a bowden wire which is connected at one end to the throttle control lever and connected at its other end to a slide rack 22 which is slidably supported on a base 23 and which together with the control lever form the controlled element. The rack 22 has teeth that are enmeshed with a pinion gear 24 which is rotatably journaled upon a shaft and which is also journaled to a manual lever 25 of the manual actuator. An electric motor 26 is coupled to the shaft through a reduction gear box assembly 27 and is operated to drive the shaft and effect movement of the throttle control lever on the propulsion unit 12 under normal conditions.

When the electric motor 26 is used to control movement of the throttle control lever, a control position detector 28 positioned within the remote control unit 11 and directly connected to the operator 16 detects the position of the operator 16 in a manner to be described. The detector 28 then transmits an electrical signal indicative of this detected position through a signal wire 29 to a comparator circuit 31 of a control unit, indicated generally by the reference numeral 32. Upon movement of the operator 16, this comparator circuit 31 also receives an electrical signal from a detector 33 associated with the actuator unit 19 which detects the position of the slide rack 22. This electrical signal outputted by the detector 33 is indicative of the detected position of the slide rack 22 and thus the position of the throttle control lever on the propulsion unit 12 which, as previously noted, is mechanically linked to the slide rack 22 through the cable assembly 18.

In operation, the comparator circuit 31 compares the signals received from the detectors 28 and 33 and outputs a difference signal to a motor control circuit 34 which, in turn, outputs a signal to the motor 26 for controlling its operation to null the difference signal. That is, upon receipt of this difference signal, the electric motor 26 is operated so that the present position of the slide rack 22 and hence the throttle control lever corresponds with the present position of the operator 16.

When the motor 26 is operated in this manner under normal conditions, it drives the shaft and pinion gear 24. Movement of the pinion gear 24 causes the slide rack 22 to slide along its base 23 to push or pull the bowden wire of cable 18 so as to effect movement of the throttle control lever until the position of the lever corresponds with the position of the operator 16. When the pinion gear 24 and manual lever 25 are engaged with the shaft, as is the case in the electric actuating mode, the manual lever 25 will also move in response to operation of the electric motor 26 and shaft so as to give a visual indication of the position of the throttle control lever.

As previously noted, there is a second actuator unit for actuation of the transmission control lever. When the system is set for control of both the throttle and transmission, this second actuator unit along with its associated components will interface with the comparator circuit 31 and motor control circuit 34 to effect movement of the transmission control lever in response to movement of the operator 16 in a manner similar to that described in connection with actuator unit 19. That is, the comparator circuit 31 also compares the signals received from the detector 28 and the detector associated with the second actuator unit and outputs a difference signal to the motor control circuit 34 which, in turn, outputs a signal to the motor associated with the second actuator for controlling its operation to null that difference signal. The electric motor associated with the second actuator is operated in response to that difference signal so that the present position of the associated slide rack and hence the transmission control lever corresponds with the present position of the operator 16.

Figure 4:
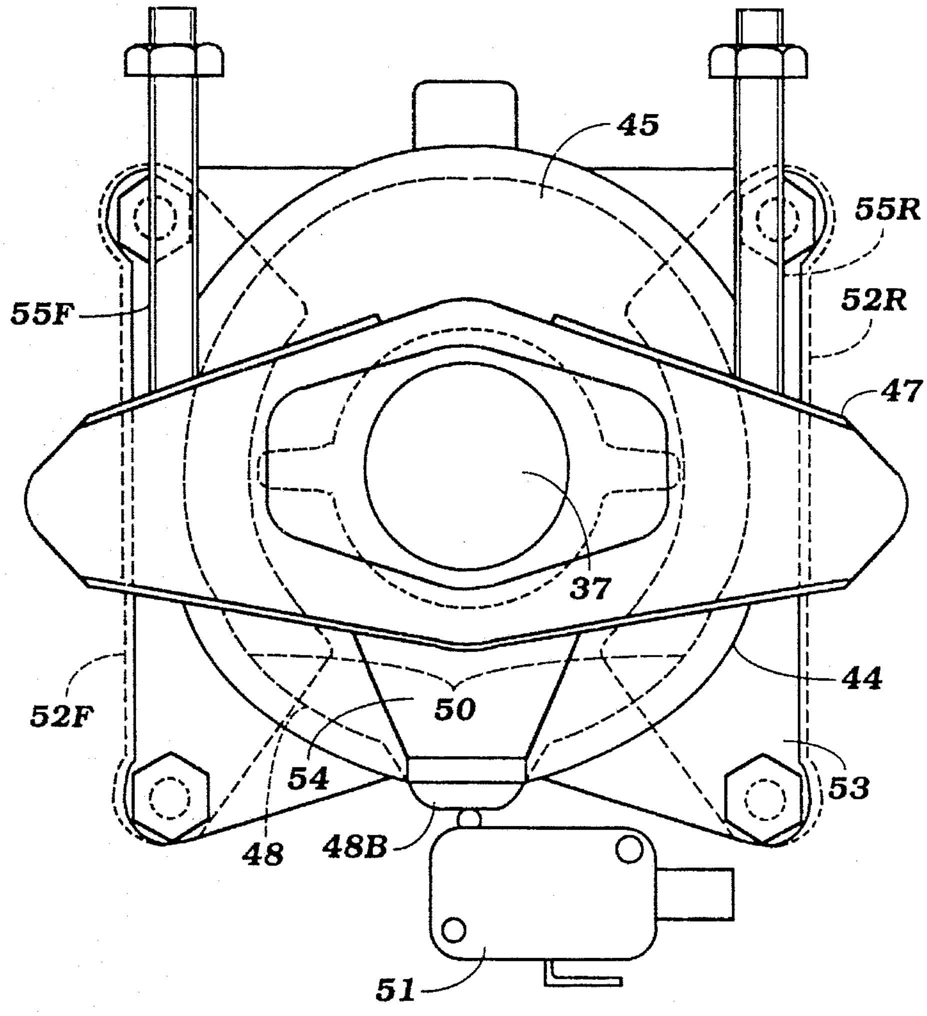
FIG. 4 is a side view of the position detector for the operator shown in FIG. 3.
Figure 5:
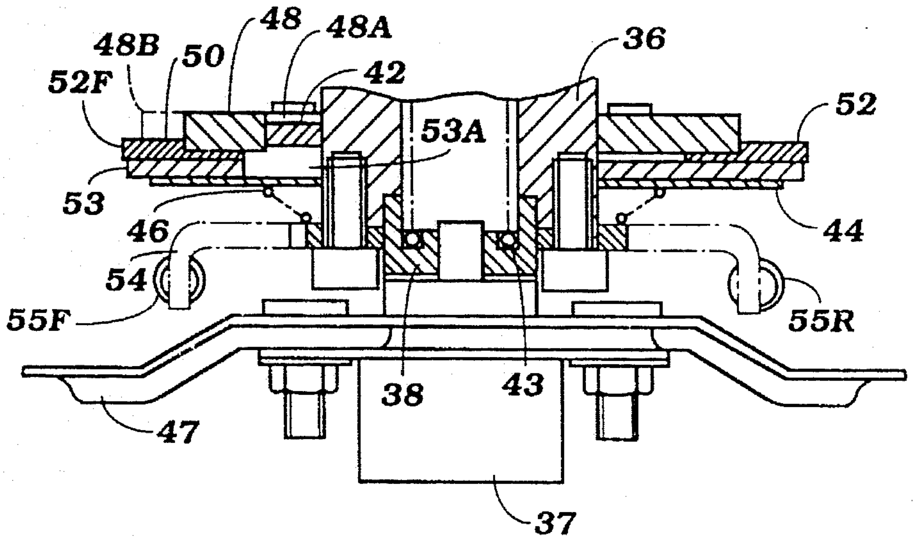
FIG. 5 is a cross sectional view taken along line 5—5 in FIG. 4.

The construction and operation of the control position detector 28 will now be described with particular reference to FIGS. 3, 4 and 5. The operator 16 is affixed to a rotating shaft 36 that is journaled for rotation within the housing 17. The control position detector 28 includes a potentiometer 37 that is connected with the operator 16 and which detects the movement of the operator 16 through the rotating shaft 36 and a coupling 38 that is connected to the shaft 36.

Figure 3:
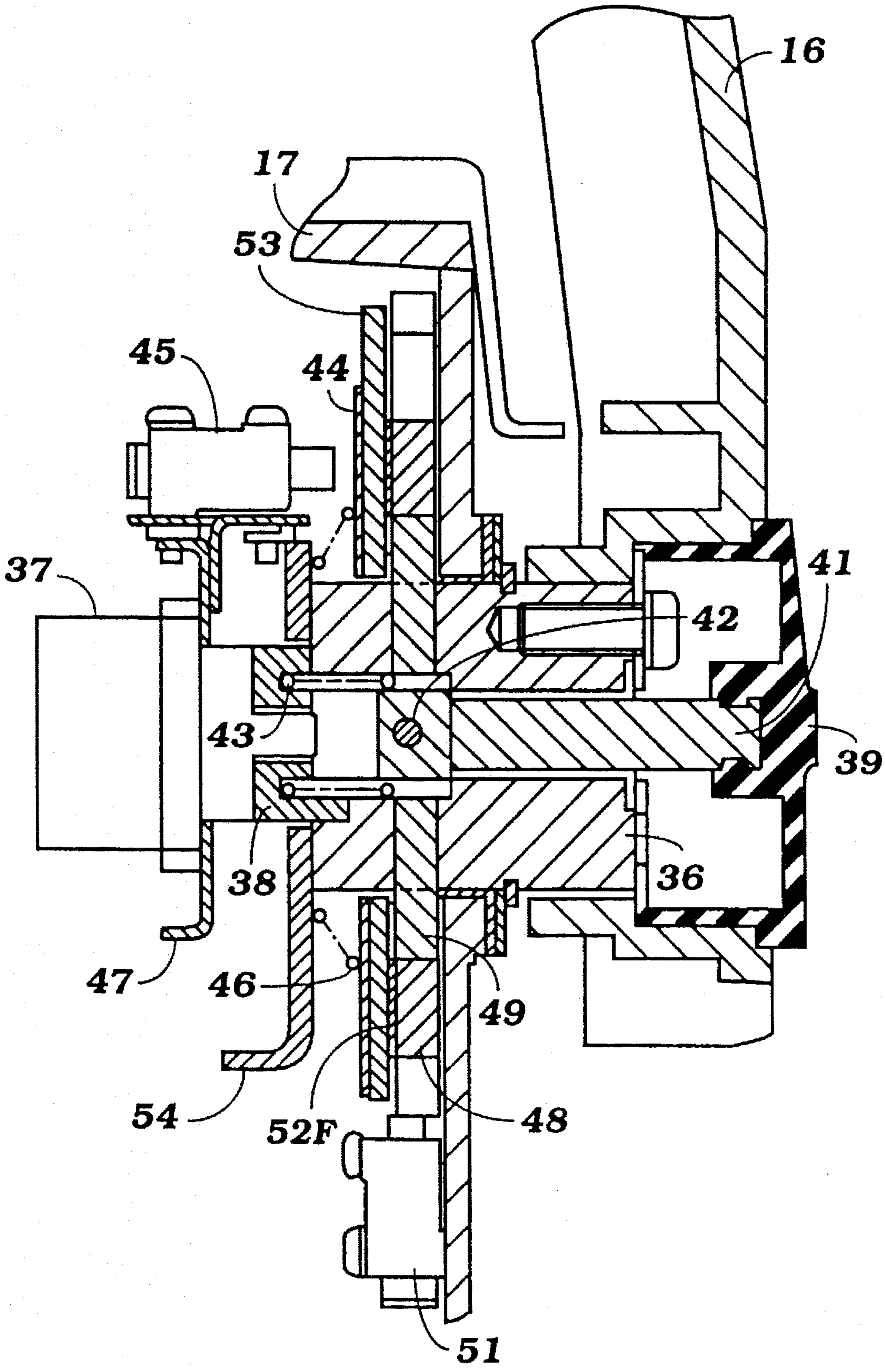
FIG. 3 is a cross sectional view showing the position detector for the operator.

To set the remote control unit 11 in the free throttle adjustment mode, the driver of the vessel pushes in on the rubber cap 39 to urge a rod 41 to the left as seen from FIG. 3. This causes a pin 42, which is affixed perpendicularly to the end of the rod 41 opposite the cap 39, to move with the rod 41 against the force of a spring 43. When the pin 42 is moved in this manner, it exerts a force on a moveable plate 44, pushing it toward a switch 45 against the force of another spring 46 to actuate the switch 45 which is mounted on a stationary piece 47 of the remote control unit 11. When this switch 45 is actuated, the remote control system 11 is adapted for free throttle operation while the transmission is maintained in neutral.

When the driver moves the operator 16 while the rubber cap 39 is pushed in, a rotary plate 48, which has an inner portion 48A that is affixed to the rotating shaft 36 through a pin 49, rotates relative to a cam piece 50 to actuate a second switch 51 as the outer portion 48B of the rotary plate 48 passes the switch 51. When the switch 51 is actuated, the potentiometer 37 operates to transmit an electrical signal to the comparator circuit 31 indicative of the movement of the operator 16. However, the transmission remains in neutral as a result of the output of the first switch 45.

A pair of friction plates, one 52F for forward action of the operator 16 and the other 52R for reverse action of the operator 16, is affixed to the housing 17 against a plate 53 that is also affixed to the housing 17. These friction plates 52F and 52R provide the rotary plate 48 with suitable friction to maintain the operator 16 at a desired forward or reverse position once it is moved from neutral. A stopper element 54 is fixed on the rotating shaft 36 for rotation therewith and serves to limit the forward and reverse rotation of the operator 16 by engaging with a stopper bolt 55F or 55R respectively.

When the rubber cap 39 is released, the action of springs 43 and 46 serve to maintain the remote control unit 11 in the transmission/throttle control mode. In this case, the switch 45 remains in the "off" position and therefore the electrical signal transmitted by the potentiometer 37 indicative of the movement of the operator 16 is used to control operation of both actuator units to adjust the transmission and throttle control levers on the propulsion unit 12 accordingly.

From the foregoing description it should be readily apparent that the disclosed remote control system provides more responsive control of control levers from one or more remote locations by at least one moveable operator and at the same time reduces the manual effort required for controlling the levers. The system is normally arranged for control of both levers but may be selected for control of only the throttle lever while the transmission is kept in neutral. Although an embodiment of the invention has been illustrated and described, various changes and modifications may be made without departing from the spirit and scope of the invention, as defined by the appended claims.

I claim:

1. In combination with a watercraft and a powering marine propulsion unit, a remote control system for transmitting control movement to first and second controlled elements comprising a control unit, a remote control unit having a housing and an operator pivotally movable between a plurality of positions relative to said housing, a rotating shaft assembly rotatably disposed within said housing and affixed to said operator for rotation therewith when said operator is pivotally moved, a first position detector having a rotatable element directly connected to one end of said rotating shaft assembly for rotation therewith and for detecting the position of said operator and outputting a signal to said control unit indicative of the detected position of said operator, a second position detector for detecting the position of said first controlled element and outputting a signal to said control unit indicative of the detected position of said first controlled element, a third position detector for detecting the position of said second controlled element and outputting a signal to said control unit indicative of the detected position of said second controlled element, an actuator unit including motor means for actuating said controlled elements on the basis of the signals received by said control unit.

2. A remote control system as recited in claim 1, wherein said first position detector further comprises a potentiometer operably connected to said rotating shaft assembly.

3. A remote control system as recited in claim 1, wherein said control unit comprises a comparator for comparing the signals received from said first, second, and third position detectors and outputting a difference signal to said actuator unit for controlling the operation of said motor means to null the difference signals.

4. A remote control system as recited in claim 1, wherein said operator can be selectively set to control only one of the controlled elements.

5. A remote control system as recited in claim 4, wherein one of said controlled elements is associated with the transmission of the marine propulsion unit and the other of said controlled elements is associated with the throttle of the marine propulsion unit and wherein said operator can be selectively set to transmit control movement only to said controlled element associated with the throttle.

6. A remote control system as recited in claim 1, wherein said rotating shaft assembly comprises a rotating shaft and a coupling that is interposed between said rotating shaft and said first position detector.

* * * * *